US008473322B1

(12) United States Patent
Mallard (10) Patent No.: US 8,473,322 B1
(45) Date of Patent: Jun. 25, 2013

(54) SYSTEM FOR TRANSLATING DATES FOR TAKING ACTION FROM POSITIONS RELATIVE TO A REFERENCE DATE TO CALENDAR DATES

(76) Inventor: Scott F. Mallard, Issaquah, WA (US)

(*) Notice: Subject to any disclaimer, the term of this patent is extended or adjusted under 35 U.S.C. 154(b) by 704 days.

(21) Appl. No.: 12/462,292

(22) Filed: Jul. 31, 2009

(51) Int. Cl.
*G06Q 10/00* (2012.01)

(52) U.S. Cl.
USPC ....... 705/7.19; 705/7.24; 705/7.26; 705/7.21; 705/7.22

(58) Field of Classification Search
USPC ............................ 705/4, 7.12–7.26, 313–316
See application file for complete search history.

(56) References Cited

U.S. PATENT DOCUMENTS

| | | | |
|---|---|---|---|
| 6,321,202 B1 | 11/2001 | Raveis, Jr. | |
| 6,594,633 B1* | 7/2003 | Broerman | 705/313 |
| 7,146,337 B1 | 12/2006 | Ward et al. | |
| 7,333,943 B1* | 2/2008 | Charuk et al. | 705/26.1 |
| 7,797,255 B1* | 9/2010 | Hastings | 705/313 |
| 2002/0040339 A1 | 4/2002 | Dhar et al. | |
| 2002/0049624 A1* | 4/2002 | Raveis, Jr. | 705/8 |
| 2002/0120477 A1* | 8/2002 | Jinnett | 705/4 |
| 2003/0220805 A1 | 11/2003 | Hoffman et al. | |
| 2005/0071212 A1 | 3/2005 | Flockhart et al. | |
| 2007/0185743 A1* | 8/2007 | Jinks | 705/4 |
| 2007/0203741 A1 | 8/2007 | Ordille et al. | |
| 2008/0065460 A1 | 3/2008 | Raynor | |
| 2008/0097777 A1* | 4/2008 | Rielo | 705/1 |
| 2008/0172327 A1* | 7/2008 | Bohonnon | 705/39 |
| 2008/0288336 A1 | 11/2008 | Charuk et al. | |

* cited by examiner

*Primary Examiner* — David Rines
(74) *Attorney, Agent, or Firm* — Timothy E. Siegel Patent Law, PLLC; Timothy E. Siegel (57) ABSTRACT

A computer network-implemented system for aiding users in a first jurisdiction, having a first set of day-types and a second jurisdiction having a second set of day-types, in translating to calendar dates action-dates of differing action-date-types, that are set in relation to a reference date. The system includes a computer network, having an input unit by which a reference date, and action-dates, and a jurisdiction, may be entered. The system also includes a memory in which the first jurisdiction and second jurisdiction day-types are stored. A calendar day determination mechanism counts number of days to the action-dates and determines the first day to satisfy the day count and that is eligible for scheduling the action-date-type, and determines and stores the action-dates in a calendar. Finally, a display mechanism displays the calendar to a user.

2 Claims, 9 Drawing Sheets

- NEW CONTRACT
  NEW DATE TEMPLATE

MANAGE CONTRACTS
  MANAGE DATE TEMPLATES

MY STATISTICS

PERSONAL SETTINGS
  CHANGE PASSWORD

MY PROFILE create a new contract   34

| | | |
|---|---|---|
| Contract Name: | Smith - Jones | ⓘ |
| Property Address: | 123 Whispering Lane, Redmond | ⓘ —36 |
| Mutual Acceptance | 21  July  2009 | ⓘ —38 |
| Day One | 22  July  2009 | ⓘ —40 |
| Closing | 13  September  2009 | ⓘ —42 |
| Region: | Washington | —43 |

Contingency & Notification Configuration

Name: ○    Start: ○   Days: ○   Sat: ○   Sun: ○   Holidays: ○  69
                63       64                66         (⊕ Add More Dates)

62 {
| Title Review | Day One | 5 | ☐ | ☐ | ☐ | 2009-7-28 |
| Well Inspection | Day One | 15 | ☑ | ☑ | ☑ | 2009-8-5 → 68 |
| Final Walk Through | Closing | 5 | ☑ | ☐ | ☑ | 2009-8-7 |

*Rows with a blank Name field will be discarded*

Select Template Configuration

Name:    Start:    Days:   Sat:  Sun:  Holidays:

80 {
| ☑ Inspection Contingency | Day One | 30 | ☑ | ☑ | ☑ | 2009-8-20 |
| ☑ Financing Contingency | Day One | 48 | ☑ | ☑ | ☑ | 2009-9-8 |
                                      78  86

Notification Recipients

(⊕ More Contacts)

| Email or Phone: | Name: | Party: |
|---|---|---|
| 8005551212 | Mary Jones | Buyer |
| Mary@comcastz.com | Mary Jones | Buyer |
| sellingtown@realty.con | M. Jane | Seller Agent | —83
| me@timekeeperpro.com | ME | User |

[ Cancel ] [ Continue ]

Fig. 3

MANAGE CONTRACTS
MANAGE DATE TEMPLATES

MY STATISTICS

PERSONAL SETTINGS
CHANGE PASSWORD

MY PROFILE

Contract Name: Smith - Jones
Property Address: 123 Whispering Lane, Redmond

Mutual Acceptance 21 | July | 2009
Day One 22 | July | 2009
Closing 13 | September | 2009
Region: Washington

Contingency & Notification Configuration

Name:   Start:   Days:   Sat:   Sun:   Holidays:

Add More Dates

| Title Review | | | □ | □ | 2009-7-28 |
| Well Inspection | | | ☑ | ☑ | 2009-8-5 |
| Final Walk Through | | | □ | ☑ | 2009-8-7 |

*Message from webpage*
⚠ Closing cannot be on a Sunday
OK

* Rows with a blank Na...

Select Template Configuration

| Name: | Start: | Days: | Sat: | Sun: | Holidays: |
| ☑ Inspection Contingency | Day One | 30 | ☑ | ☑ | ☑ | 2009-8-20 |
| ☑ Financing Contingency | Day One | 48 | ☑ | ☑ | ☑ | 2009-9-8 |

Notification Recipients

More Contacts

| Email or Phone: | Name: | Party: |
|---|---|---|
| 8005551212 | Mary Jones | Buyer |
| Mary@comcastz.com | Mary Jones | Buyer |
| sellingtown@realty.con | M. Jane | Seller Agent |
| me@timekeeperpro.com | ME | User |

Cancel   Continue

Fig. 4

Actions

NEW CONTRACT
NEW DATE TEMPLATE

MANAGE CONTRACTS
MANAGE DATE TEMPLATES

MY STATISTICS

PERSONAL SETTINGS
CHANGE PASSWORD

MY PROFILE

Smith - Jones EDIT
*123 Whispering Lane, Redmond*

| | | View Calendar |
|---|---|---|
| Mutual Acceptance: | 2009-07-21 | Print View |
| First Day: | 2009-07-22 | |
| Closing: | 2009-09-14 | Outlook Integration |
| Status: | Pending | |

Email & Text Notification Set-up — 22 — 68

| Name: | Buyers | Sellers | Buyers Agent | Sellers Agent | Escrow | User | Email | TextMsg | T-Minus |
|---|---|---|---|---|---|---|---|---|---|
| Title Review | ☑ | ☐ | ☐ | ☐ | ☐ | ☑ | ☑ | ☑ | 2 ▼ |
| Well Inspection | ☑ | ☐ | ☐ | ☐ | ☐ | ☑ | ☑ | ☑ | 3 ▼ |
| Inspection Contingency | ☑ | ☐ | ☐ | ☑ | ☐ | ☑ | ☑ | ☑ | 3 ▼ |
| Final Walk Through | ☐ | ☐ | ☐ | ☐ | ☐ | ☑ | ☑ | ☑ | 2 ▼ |
| Financing Contingency | ☑ | ☐ | ☐ | ☑ | ☐ | ☑ | ☑ | ☑ | 3 ▼ |

70

[Clear]

Contact Emails and Phone Numbers

[More Contacts]

| Email or Phone: | Name: | Party: | |
|---|---|---|---|
| 8005551212 | Mary Jones | Buyer ▼ | |
| Mary@comcastz.com | Mary Jones | Buyer ▼ | —83 |
| sellingtown@realty.con | M. Jane | Seller Agent ▼ | |
| me@timekeeperpro.com | ME | User ▼ | |

[Cancel] [Save]

Fig. 5

Actions

NEW CONTRACT
NEW DATE TEMPLATE

MANAGE CONTRACTS
MANAGE DATE TEMPLATES

MY STATISTICS

PERSONAL SETTINGS
CHANGE PASSWORD

MY PROFILE

Smith - Jones EDIT
*123 Whispering Lane, Redmond*

| | |
|---|---|
| Mutual Acceptance: | 2009-07-21 |
| First Day: | 2009-07-22 |
| Closing: | 2009-09-14 |
| Status: | Pending |

- View Calendar
- Print View
- Edit Reminders
- Change Status
- Integrate Outook

Contingencies

| Name: | Days | Expires | Email. | SMS | T-Minus |
|---|---|---|---|---|---|
| Title Review | 5 | 2009-07-28 | Yes | Yes | 2 |
| Well Inspection | 15 | 2009-08-05 | Yes | Yes | 3 |
| Inspection Contingency | 30 | 2009-08-20 | Yes | Yes | 3 —— 84 |
| Final Walk Through | 5 | 2009-09-08 | Yes | Yes | 2 |
| Financing Contingency | 48 | 2009-09-08 | Yes | Yes | 3 |

Notification Emails and Phone Numbers
EDIT

| | | | |
|---|---|---|---|
| Mary Jones | 8005551212 | Buyer | |
| Mary Jones | Mary@comcastz.com | Buyer | |
| H. Jane | sellingtown@realty.con | Seller Agent | —— 86 |
| ME | me@timekeeperpro.com | User | |

Send Outlook Calendar to Parties

☐ Buyer     ☐ Seller Agent —— 88
☐ Seller    ☐ Escrow
☒ Buyer Agent ☐ User      [Email]

*Sends an email to the party/parties above, accepting parties will have contingent dates added to their outlook calendars.*

TimeKeeperPro.com

JDOE's PROFILE

Actions

NEW CONTRACT
➤ NEW DATE TEMPLATE

MANAGE CONTRACTS
MANAGE DATE TEMPLATES

MY STATISTICS

PERSONAL SETTINGS
CHANGE PASSWORD

MY PROFILE

Date Templates
add new contingency template

Create a New Date Template

Name:

Days:

Calculation Point: [Day One ▾] — 96

Description:

[Cancel] [Submit]

Current Templates

|  | # of Days | Starting Point |
|---|---|---|
| INSPECTION CONTINGENCY | 30 | Day One |
| FINANCING CONTINGENCY | 30 | Day One |

SYSTEM FOR TRANSLATING DATES FOR TAKING ACTION FROM POSITIONS RELATIVE TO A REFERENCE DATE TO CALENDAR DATES

BACKGROUND OF THE INVENTION

There are many situations in which dates are set, each indicating a deadline for some action, relative to some reference date. When a real estate sales contract is signed, for example, a number of dates, by which time some action must take place, are set relative to the contract signing date. Other dates requiring action may be set relative to the closing date. Typically the real estate agent simply counts off days on his calendar and marks the dates, using his knowledge of the contract and local rules as his guide. Later, the real estate agent regularly checks this calendar to be reminded of upcoming dates by which time some task must be performed.

This method is, unfortunately, likely to lead to failure at some point. First, any human counting activity may go astray due to simple human error. Although this may be unlikely for any particular instance of counting, out of hundreds of counting tasks it is likely that in a few there will be human error with the attendant possibility of a real problem developing.

Second, most action-dates can only be scheduled on business days, and these vary from jurisdiction to jurisdiction. Accordingly, an agent who is new in a particular area may be taken by surprise by a locally recognized holiday that causes him to schedule an action day on a day that is not eligible for the scheduling of the action day type. Alternatively, a minor holiday may be the source of some confusion for the scheduler who has a lack of knowledge of whether or not it is an official holiday or official business day.

Also, in some states experiencing a budget crunch, the employees working in the county recorder's offices are periodically furloughed, to save money. Unless some system is in place for noting this in the calendaring of closing date it may be quite easy to forget, with attendant difficulties when the closing is delayed, delaying a payment that the seller might have been counting on in order to make some necessary payment of his own, and causing the seller to form a low opinion of the real estate professional who scheduled a closing on a day upon which it could not take place. It would, however, be acceptable to schedule other types of real estate action-date-types on a furlough day.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In a first separate aspect the present invention may take the form of a computer network-implemented system for aiding users in a first jurisdiction, having a first set of day-types and a second jurisdiction having a second set of day-types that is different from the first set of day-types, by translating to calendar dates action-dates of differing action-date-types, that are set in relation to a reference date, and displaying the calendar dates. The system includes a computer network, having input units by which a reference date, and action-dates set in relation to the reference date, and a jurisdiction, may be entered. The system also includes a computer-readable memory in which the day-types of the first jurisdiction are stored and in which the day-types of the second jurisdiction are stored. In addition a calendar day determination mechanism counts number of days to the action-dates and determines the first day to satisfy the day count and is eligible for scheduling an action-date-type being scheduled, informed by the reference date, the jurisdiction and by the day-types for the jurisdiction as stored in the computer and determines and stores the action-dates in a calendar. Finally, a display mechanism displays the calendar to a user.

In a second separate aspect, the present invention may take the form of a system for aiding users in noting action-dates, each action-date being of an action-date-type and being defined in relation to a first date. Some days are significant because they are ineligible for scheduling an action-date of a first action-date-type Also, changes may occur in the set of days that are ineligible for scheduling action-dates of the first action-date-type. The system includes a computer network, having a server and an input unit by which a new ineligible date may be entered into the server and a plurality of client computers, contactable by the server. In addition a communications mechanism is available for sending the new ineligible date from the server to the client computers.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced drawings. It is intended that the embodiments and figures disclosed herein are to be considered illustrative rather than restrictive.

DETAILED DESCRIPTION OF THE PREFERRED EMBODIMENTS

In a preferred embodiment the present invention takes the form of a system 10 for translating a date for taking a particular action (action-date) given relative to a reference date that is established by, for example, the signing of a contract, into a calendar date. The user may indicate whether Saturdays or Sundays or holidays (non-business or "NB day") or some combination of these day-types should be counted. If the user indicates that holidays are to be not counted, the system does not count the holidays which are legally recognized in the appropriate jurisdiction. In real estate this would be the jurisdiction in which the property being transferred is located. The system automatically prevents translation of a relative date onto a calendar date on which the action cannot take place. For example, in the instance of real estate in the State of Washington, no action-date may be scheduled on Saturdays, Sundays and Holidays. In a special case, due to budget problems there can be days in which state and county employees are furloughed, and as a result the county recorder's office is closed. Accordingly, in this case, a closing may not be scheduled for a furlough day, although other types of action-dates could be.

The system 10 may include a day-counting computer program, which may be considered a mechanism, and computer readable memory storing a data-base of day-types in a set of jurisdictions, hosted on an Internet server 12, which can be contacted by any client or user's computer 14 connected to the Internet. In an alternative preferred embodiment, the day-counting program, and a dataset of day types for one or more local jurisdictions, is hosted on the user's computer 14 and is updated as needed by the server 12, either by sending out an Email with update code as an attachment or a link to a website (possibly hosted on server 12), or by sending an instructional text-message to the user's cell phone, which can be used for updating the program on the user's computer.

For either embodiment, a new user would use his computer 14 to contact server 12, over the Internet, to set up an account. The user would be prompted to enter a username and password, and identifying personal and contact information. After the account is set up, the user either downloads a program to his own computer 14 or sends sets of relative-day-set information, for example the set of action-dates established when a real estate contract is signed to the server 14.

Figure 2:
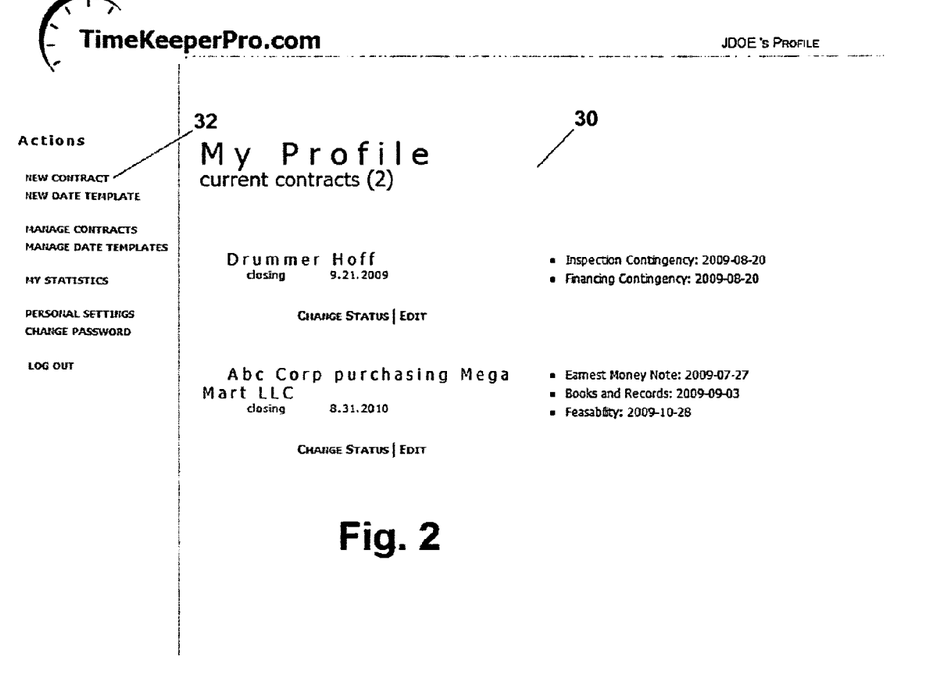
FIG. 2 shows a user profile computer screen display, first displayed when a user accesses the system of FIG. 1.

Referring to FIG. 2, a screen display appearing in a system 10 used by a real estate agent, includes a dashboard 30, showing information regarding the user's contracts. In addition, a new contract button 32 is clicked by a user to begin the process of entering the information necessary for system 10 to determine the set of calendar dates.

Figure 3:
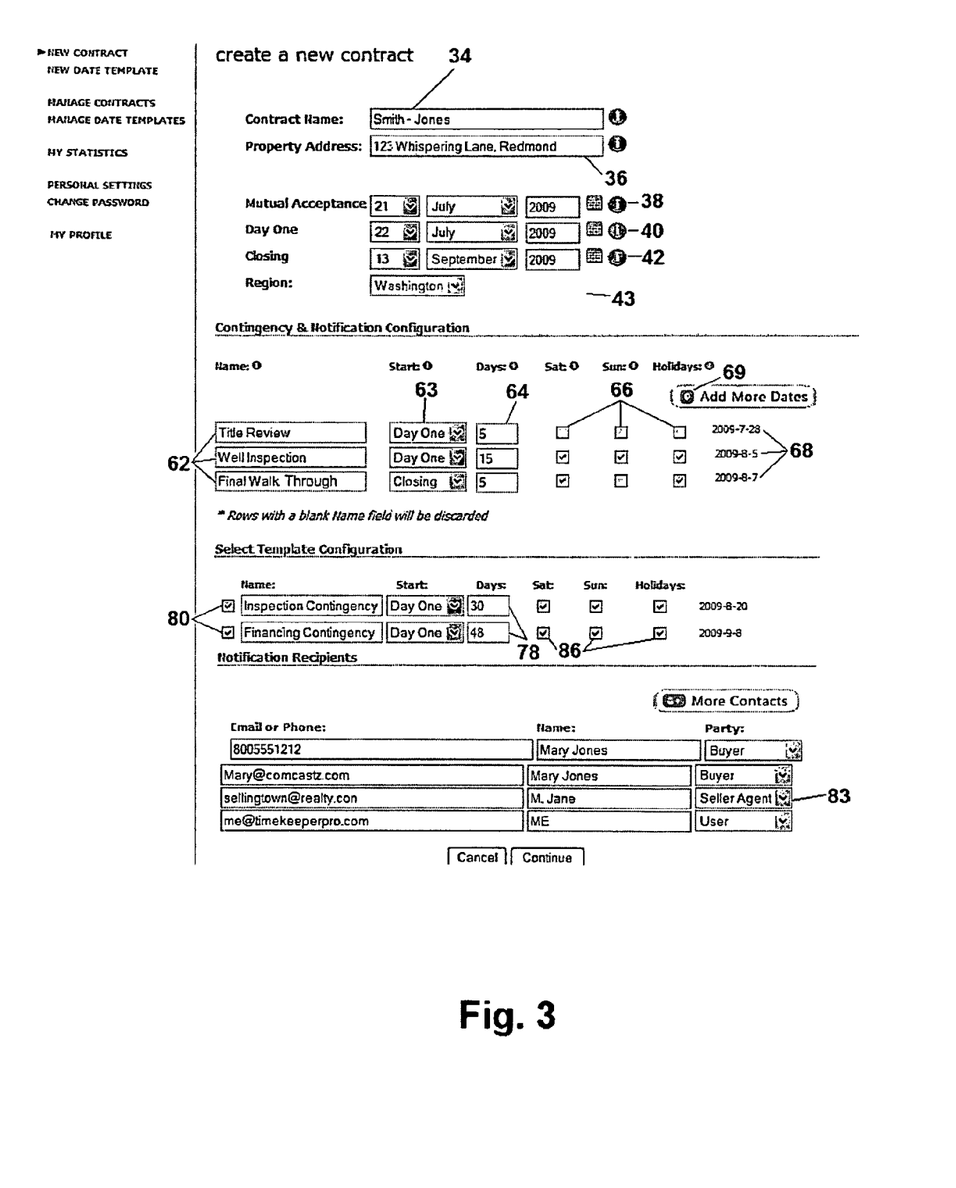
FIG. 3 shows a further computer screen display, driven by the system of FIG. 1, for permitting a user to begin the entry of contract information for a new contract.

Referring to FIG. 3, the user may begin by entering a contract name in dialogue box 34, typically the names of a party transferring a property and the address of the property being transferred in dialogue box 36, which sets the jurisdiction. In a preferred embodiment, a dropdown menu jurisdiction-selection indicator is provided, to enable the user to unambiguously enter the jurisdiction whose rules will govern contract interpretation. Next the date of mutual acceptance is entered in dialogue box assemblage 38. In some jurisdictions the counting of the days starts on the day of mutual acceptance, whereas in other jurisdiction the counting begins on the day after mutual acceptance. In general, however, local custom may be overridden by express contract terms. Accordingly, the user sets the "first day" information in dialogue box assemblage 40 and closing date in dialogue box assemblage 42. A region entry box 43 permits a user to enter the region (jurisdiction) whose laws and rules will cover the contract.

In addition, the user can enter action-dates, of differing action-date-types into the system. In the case of a real estate contract the action-date-types would typically be title check, inspection, financing and closing. There are, however, a great number of potential action-date-types that may appear in a real estate sales contract and even more in the many different types of contracts that may be formed in various industries. In the case of a real estate sales contract, all the action-date-types typically must be scheduled on a regular business day, but the closing must also be scheduled on a day that is not a furlough day.

The user enters action-dates by filling the action-date-type in box 62; the day relative to which the calendar date should be determined is entered by drop down menu 63; the number of days separating the action-date from this day (in box 64); and whether Saturdays or Sundays or Holidays should be counted when determining the Calendar date (check boxes 66). If a date is set relative to the closing date, as is the final walk through, the system 10 counts backwards from the closing date. The calendar dates 68 resulting from the data entered in boxes 62, 63, 64 and 66 and shown at the side of the display. An add more dates button 70, adds a row when clicked. A set of default action-date dialogue boxes 76 are also provided, with number of days display 78, pre-set to a default, to save user time. The user may choose the defaults by means of check boxes 80, and may change the information, if desired, by means of data-input assemblage 78 and 82. In a preferred embodiment, discussed below, the user may edit the default action-dates. In a preferred embodiment, if the user enters and tries to save a Saturday, Sunday or Holiday date for an action-date-type that must occur on a regular business day, the system will refuse to save this entry.

In addition the Email(s) and telephone number(s), of a group of deal-interested people, such as buyers, sellers, buyers' agent(s), sellers' agent(s), brokers, etc., are in a contact information entry array 83.

Figure 4:
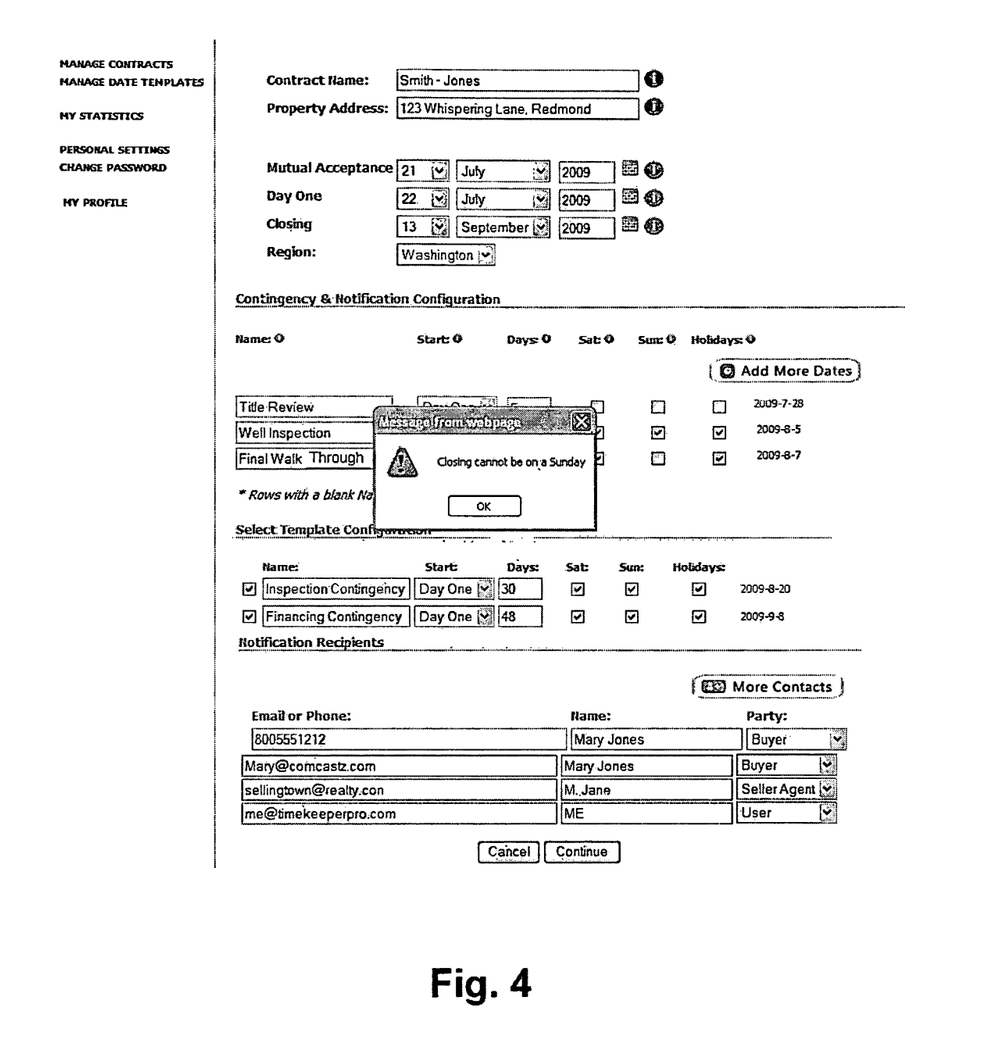
FIG. 4 shows the computer screen display of FIG. 3, with the addition of an indicator that an incorrect data entry has been blocked.

Referring to FIG. 4, if the user attempts to enter a date for mutual acceptance, day one or closing that is not permitted, for example because it is a Sunday, a warning box 85 appears and the user must return to the screen of FIG. 3, to correct the data before continuing.

Figure 5:
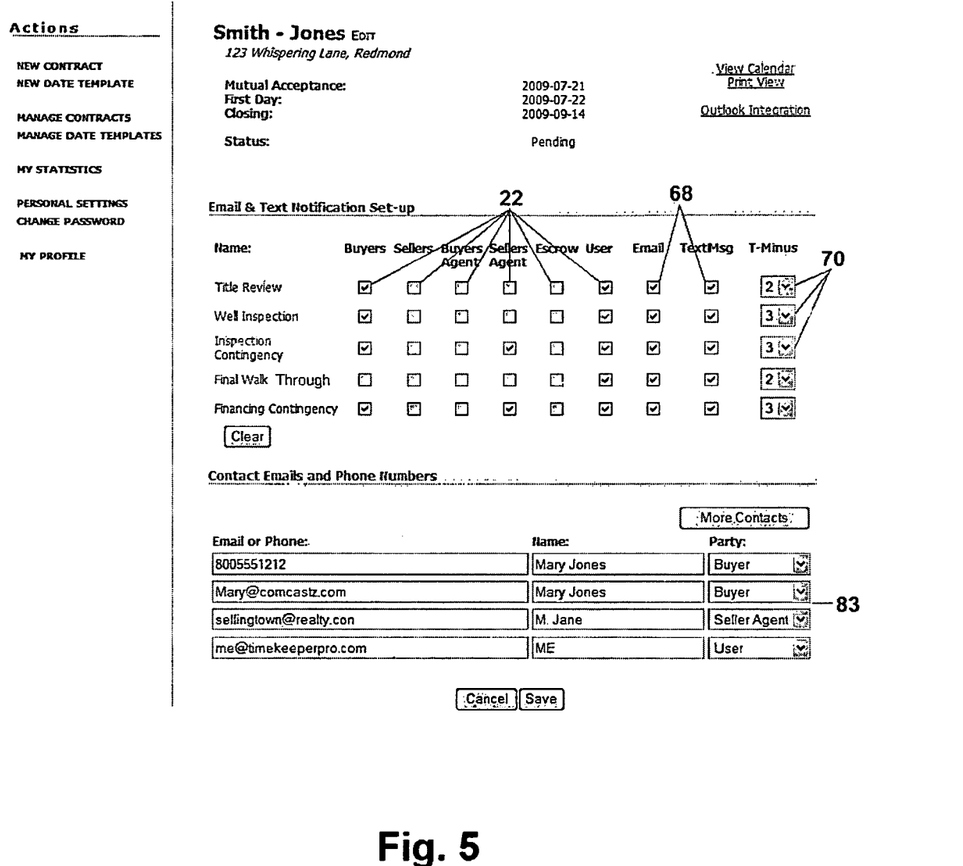
FIG. 5 shows a further computer screen display, driven by the system of FIG. 1, for permitting a user to enter further contract information.

Referring to FIG. 5, the user may indicate, for each action-date whether notifications should use Email or text messages (typically using the short message service [SMS] protocol) or both (check boxes 68), how many days before the action a notification is to be given (drop-down menu 70), in addition to a notification on the action-date itself; and which deal interested people should be notified (check boxes 72). In an alternative preferred embodiment the user himself is always notified. The contact information entry array 83 is repeated on this webpage, for user convenience.

Figure 6:
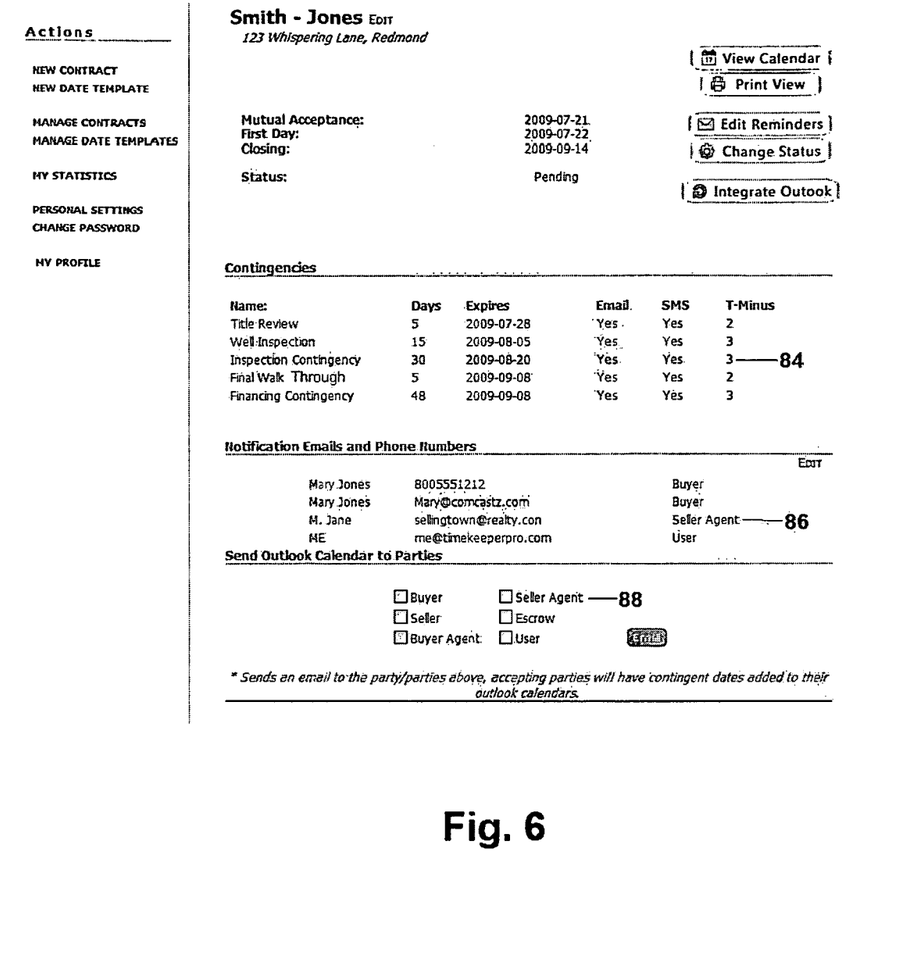
FIG. 6 shows a further computer screen display, driven by the system of FIG. 1, displaying contract driven action-dates translated to calendar dates.
Figure 7:
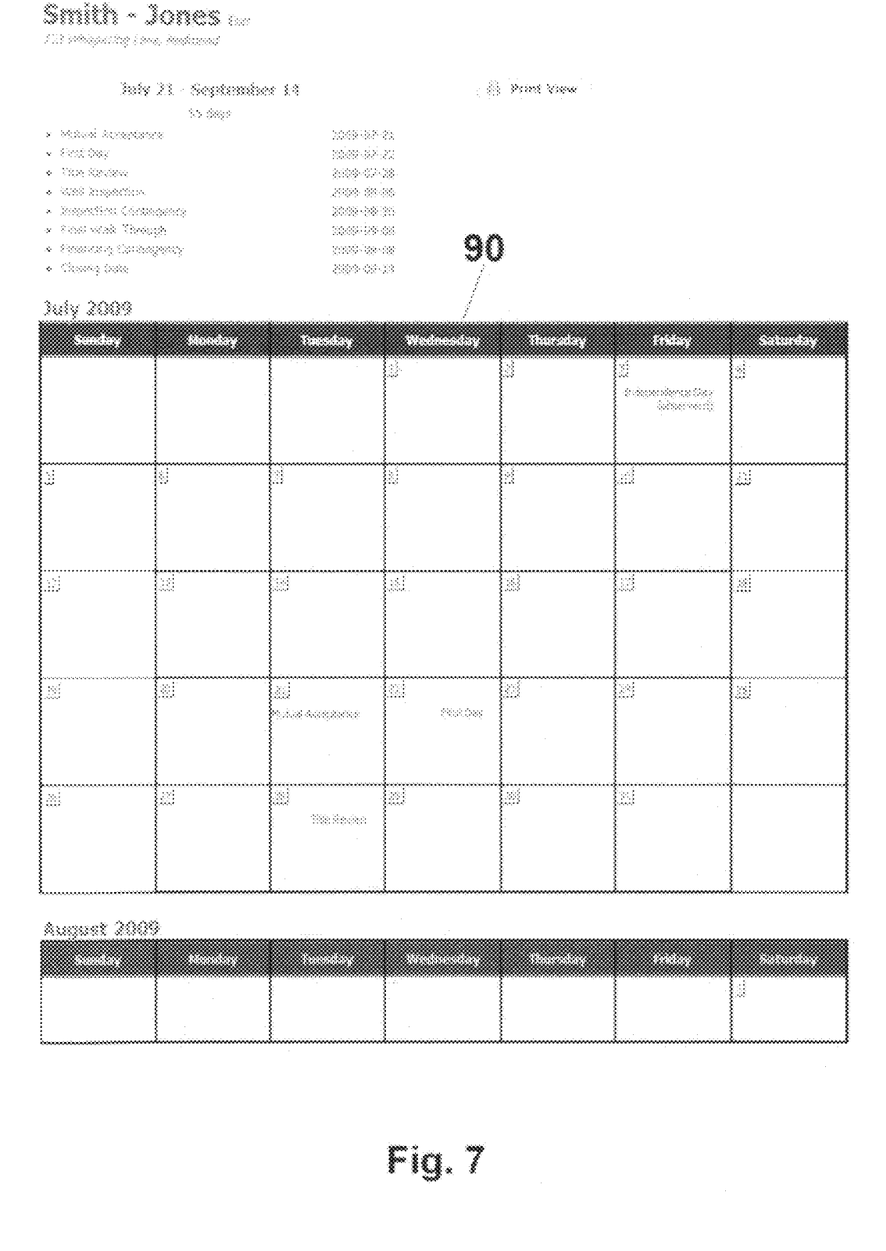
FIG. 7 shows a further computer screen display, showing action-dates marked in a calendar.
Figure 8:
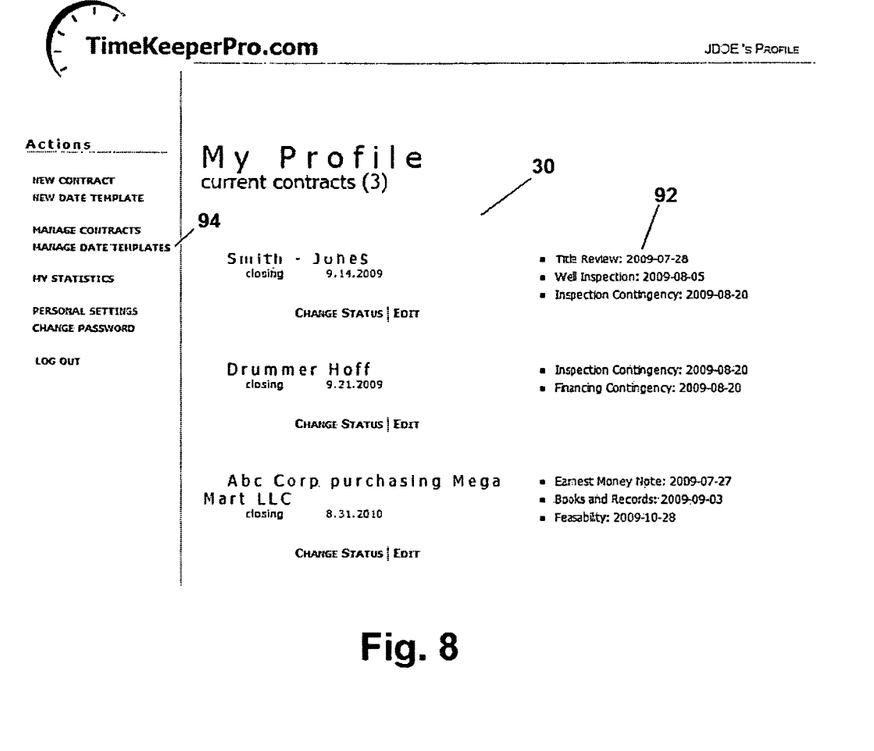
FIG. 8 shows the display of FIG. 2, updated by the new contract information.

Referring to FIG. 6, a user may now view a list of action-dates and notification contact information 84. Also, contact information is displayed 86. The user is also given the opportunity, using check box array 88 to send an Email to selected parties that will integrate the date information into Microsoft® Outlook or another calendaring system. In addition the user can be automatically notified, together with buyers or sellers or both, a user-selected number of days prior to an action-date. Referring to FIG. 7, the user may now see the action-dates set into a calendar 90. Referring to FIG. 8, when the user returns to the dashboard 30, the information regarding the Smith-Jones contract just entered 92 is visible.

Figure 9:
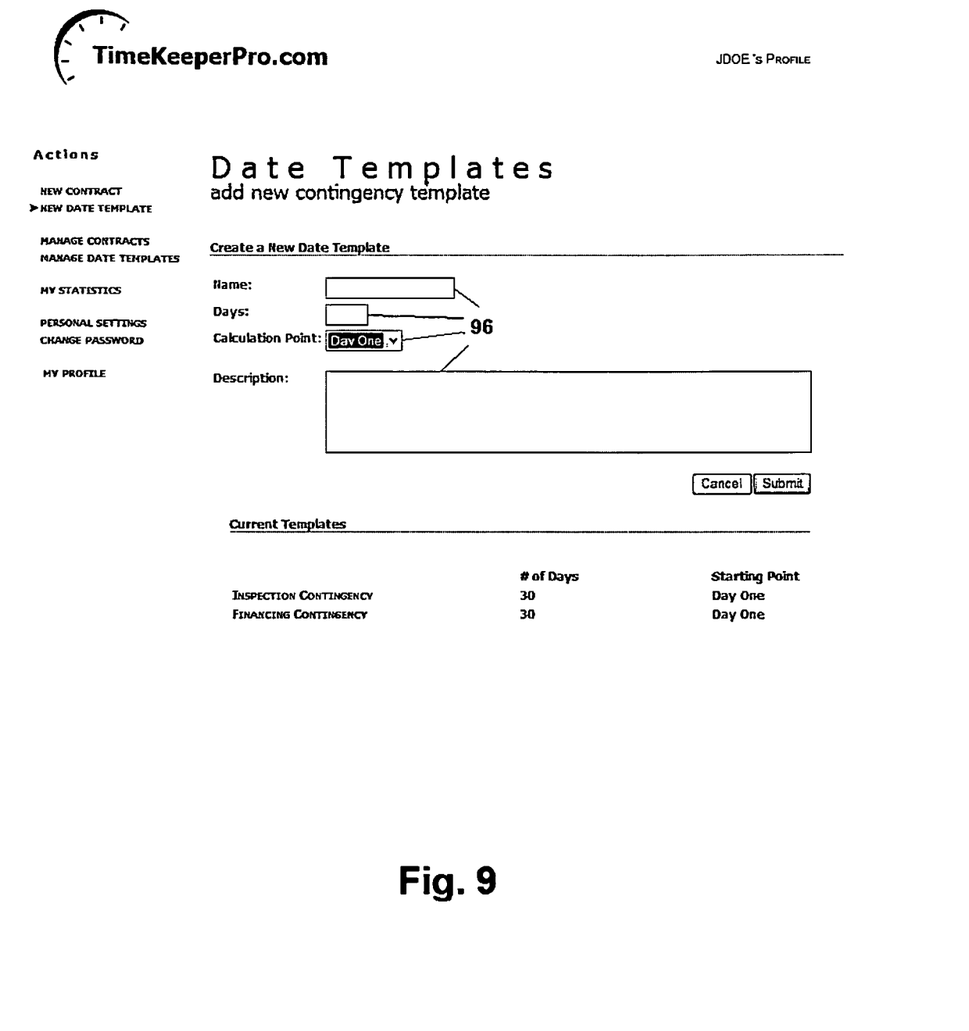
FIG. 9 shows a computer screen display for permitting a user to input a new default action-date-type.

As noted earlier, system 10 permits a user to enter a new default action-date-type. A button marked "manage new templates" 94 is provided on dashboard 30, and leads to the screen display FIG. 9 which includes an assemblage of data entry boxes 96, for achieving this goal.

To use the system 10, a user first logs into a website from where he can sign up for the service. After entering a username and password and entering contact information, the user is ready to make use of the system 10. The first time the user logs on he is presented with the "dashboard" shown in FIG. 2. To determine the calendar dates for a new contract the user clicks on the new contract button and is taken to the display of FIG. 3. In this instance, the property is located in a jurisdiction in which the first day of a contract is considered the first business day after the contract signing (mutual acceptance). The system prevents a user from entering a "first day" that is not a regular business day.

In this example, the contract specifies that a title review must be performed within 5 days post the first day. Because this day is scheduled so soon after contract signing, only business days (as defined in the contract jurisdiction) are counted. Accordingly, the user does not check Saturday, Sundays or Holidays. The first day is Jun. 5, 2009, so counting five business days, the day on which the title check must be completed is set as Jun. 11, 2009.

The Smith-Jones contract is fairly standard, and the time for completing inspection of the property and for arranging financing conform with the default options, so the user may save some time by simply checking the default action-date boxes 80. In one preferred embodiment the default days to count are also stored. In this case, Saturdays, Sundays and Holidays are counted in determining the inspection date and the financing date; these days are, however, not eligible for being set as an action-date. If the day count indicates that an action-date should fall on a Saturday, Sunday or Holiday, the action-date is set for the next business day. Accordingly, the financing contingency date, which the day count indicates should fall on Sep. 7, 2009, which is Labor Day, a U.S. Holiday, is automatically moved to Sep. 8, 2009, the immediately subsequent next business day. In an additional preferred embodiment the feature in which an action-date may not be scheduled on ineligible dates may be selectively overridden by a user. After the calendar dates are determined they are displayed on a calendar shown on a display mechanism, such as a computer screen.

Figure 1:
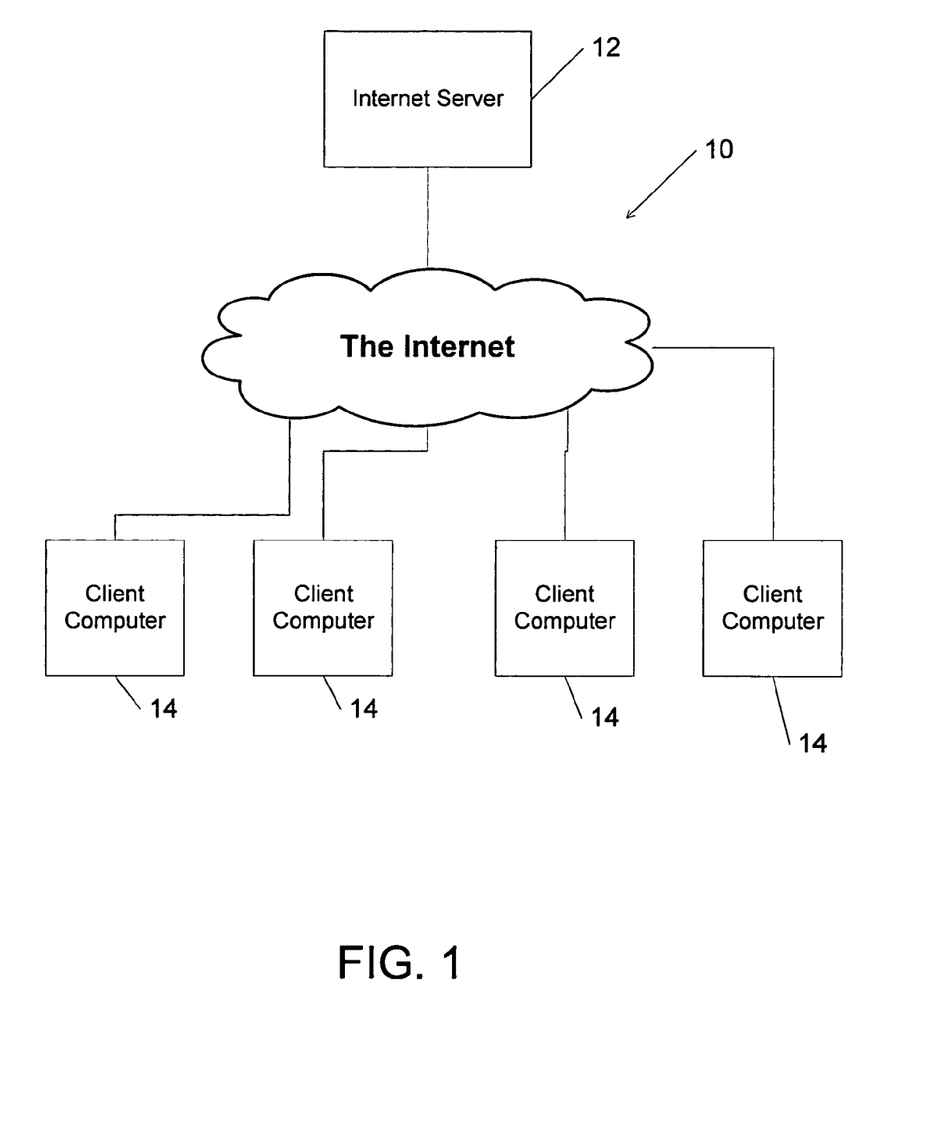
FIG. 1 is a block diagram of a system according to the present invention.

If a new furlough day(s) is announced by a state an operator of server 12 may enter these new days into server 12 and command server 12 to send the new furlough days to all of the client computers 14 that have signed up for the date translation service in the state that has declared the new furlough days. In an alternative preferred embodiment the user may input furlough days. When client computers 14 receive the new furlough day information, they automatically reschedule any closing that has been set for a furlough day, to the next available business day. A notification is sent to the user, and if desired, to all parties that have been set up to receive notices, announcing the rescheduling and providing a brief explanation. The parties then have the opportunity to reschedule, once again, if the new closing date conflicts with one of their schedules.

In a preferred embodiment, a user may enter his own dates that are ineligible for scheduling important action dates. For example, the user may want to avoid scheduling a real estate closing on day on which he knows he will be on vacation. In one preferred embodiment, this does not override any scheduled date, but creates a new scheduled date, which would be the last practical date upon which the user could schedule the action-date. For example, if the user would be unavailable on a real estate sale closing date, this could not override the contract terms. But it would be handy to have a reminder that the day before the closing was the last day that he could personally attend the closing.

While a number of exemplary aspects and embodiments have been discussed above, those possessed of skill in the art will recognize certain modifications, permutations, additions and sub-combinations thereof. In particular, although the system has been described in relation to real estate sales contracts, there is no intent to limit the use of the system to this type of contract, or to contracts at all. Rather, the system may be used in any situation where an action-date or set of action-dates is set in relation to one or more reference dates, and where it is necessary to translate these action-dates to calendar dates. As a further example, wedding planning is one potential application of the present invention. It is therefore intended that the following appended claims and claims hereafter introduced are interpreted to include all such modifications, permutations, additions and sub-combinations as are within their true spirit and scope.

The invention claimed is:

1. A computer network-implemented system for aiding users in a first jurisdiction, having a first set of day-types and a second jurisdiction having a second set of day-types that is different from said first set of day-types, of translating to calendar dates action-dates of various action-day-types that are set in relation to a reference date, and displaying said calendar dates, said system comprising:

(a) a computer network, having input units by which a reference date, and action dates set in relation to said reference date, and a jurisdiction, are entered;

(b) computer-readable memory in which said day-types of said first jurisdiction are stored and in which said day-types of said second jurisdiction are stored, wherein said first jurisdiction is a first state of the United States of America, and said second jurisdiction is a second state of the United States of America; and wherein said first set of day-types and said second set of day-types include furlough days, which are different between said first state and said second state;

(c) a calendar day determination mechanism that counts number of days to said action-dates and determines the first day to satisfy said day count and is eligible for scheduling an action-date-type being scheduled, wherein said eligibility is based on said reference date, said first jurisdiction and second jurisdiction, and said day-types for said first jurisdiction and said second jurisdiction as stored in said computer and determines and stores said action-dates in a calendar;

(d) a display mechanism for displaying said calendar to a user.

2. A computer network-implemented system for aiding users in a first jurisdiction, having a first set of day-types and a second jurisdiction having a second set of day-types that is different from said first set of day-types, of translating to calendar dates action-dates of various action-day-types that are set in relation to a reference date, and displaying said calendar dates, said system comprising:

(a) a computer network, having input units by which a reference date, and action dates set in relation to said reference date, and a jurisdiction, are entered;

(b) computer-readable memory in which said day-types of said first jurisdiction are stored and in which said day-types of said second jurisdiction are stored, wherein said first jurisdiction is a first state of the United States of America, and said second jurisdiction is a second state of the United States of America; and wherein said first set of day-types and said second set of day-types include holidays, which are different between said first state and said second state;

(c) a calendar day determination mechanism that counts number of days to said action-dates and determines the first day to satisfy said day count and is eligible for scheduling an action-date-type being scheduled, wherein said eligibility is based on said reference date, said first jurisdiction and second jurisdiction, and said day-types for said first jurisdiction and said second jurisdiction as stored in said computer and determines and stores said action-dates in a calendar;

(d) a display mechanism for displaying said calendar to a user.

\* \* \* \* \*